G. GATES.
ENDLESS TRAVELING BELT WITH STANDING SIDES.
APPLICATION FILED APR. 9, 1908.
927,648.
Patented July 13, 1909.
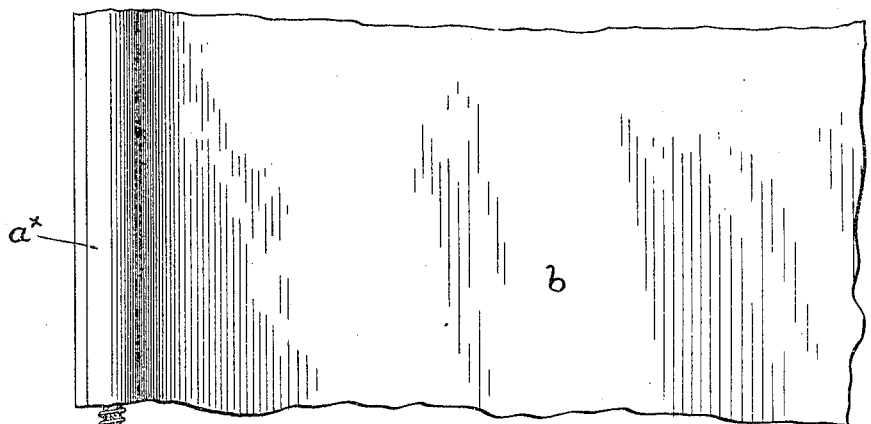
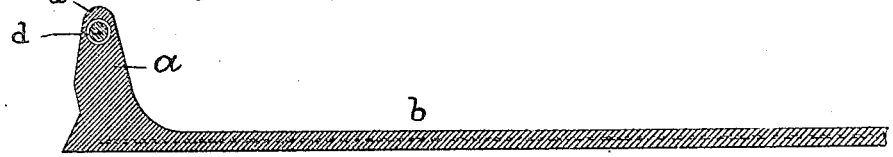
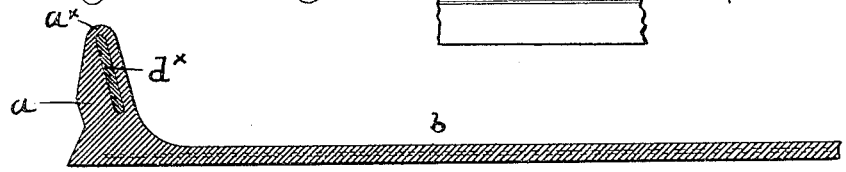
Witnesses:
Arthur L. Slee.
F. G. Osborn.
Inventor.
George Gates,
By J. S. Barker.
his Attorneys

UNITED STATES PATENT OFFICE.

GEORGE GATES, OF ALAMEDA, CALIFORNIA.

ENDLESS TRAVELING BELT WITH STANDING SIDES.

No. 927,648.     Specification of Letters Patent.     Patented July 13, 1909.

Application filed April 9, 1908. Serial No. 426,054.

*To all whom it may concern:*

Be it known that I, GEORGE GATES, a citizen of the United States, and a resident of Alameda, in the county of Alameda and State of California, have invented new and useful Improvements in Endless Traveling Belts with Standing Sides, of which the following is a specification.

This invention relates to improvements made in an endless belt with standing sides along the edges, such as is used in ore-concentrating machines to form the endless traveling sluiced surface on which the ore-pulp is concentrated, and for other purposes where an endless conveying surface with raised or standing sides to confine the material being conveyed or operated on is required to travel and return over drums or rollers.

The object of the invention is chiefly to provide a raised or standing side on an endless traveling belt, that will withstand the tension, strain and wear to which it is exposed and subjected in running on and returning over the rollers at the end of the machine, and that will have the quality of preserving its shape and stiffness without cracking or breaking down for a much longer time than the ordinary standing side as heretofore formed on the belts of the same description now in use.

To this end and object the invention consists in an endless traveling belt with standing sides having the sides reinforced and strengthened as hereinafter described and pointed out in the claims at the end of this specification reference being had therein to the accompanying drawing in which—

Figure 1 represents in plan or top-view a portion of an endless belt embodying my said invention, the same showing a portion of the standing-side along one edge, with the material removed from around the reinforcing means that extends beyond the lower end of the standing-side. Fig. 2 is a vertical transverse section through Fig. 1. Fig. 3 illustrates a slight modification in which a flat elastic reinforcing-strip is substituted for the cylindrical reinforcing-strip seen in Figs. 1 and 2. Fig. 4 is a side elevation of the raised side seen in Fig. 3, the view being taken from the left side of Fig. 3.

The endless traveling belt to which my invention is applied as shown in the above figures of the drawing is constructed at the present time of rubber or rubber and canvas, the standing side $a$ being formed integrally with the bottom or carrying surface $b$ of the belt by molding and vulcanizing the material in the well known manner. But owing to the constant bending and returning around the carrying rollers to which the standing-side is exposed when in operation, it becomes cracked on the edges and frequently is rendered unserviceable before the body or carrying-surface of the belt is worn out. This is especially the case of the rubber belts manufactured for ore-concentrating machines on which the standing-sides are made of more elastic material than the body of the belt and have also less thickness of material along the top than at the bottom where the standing sides join the body, in order to afford the greatest elasticity to the material at the part that is exposed to the greatest strain and stretching. By reason of such construction, however, the durability of the standing-sides has heretofore been of relatively short duration, and the life of a rubber concentrator-belt is limited by the serviceableness of its standing edges. When those parts become cracked or broken down, the belt is no longer usable and it must be replaced even though the carrying surface is yet unworn. This defect and weakness in the standing sides of a rubber belt I have succeeded in overcoming by placing within the material of the standing side $a$ along their top-edge $a^\times$ at the time of molding the belt, a strip of elastic rubber $d$ incased in woven fabric $e$ in such form or manner that the strip and its casing will be inclosed by and embedded within the rubber of the standing-side. This strengthening-strip is best formed of a rubber cord having a covering of woven fabric, and a surrounding spirally-laid wire of spring brass $f$ like a helical spring, slipped over the covered cord, at the time it is placed in position in the "dough" at the time of molding the belt. By using a flat strip $d^\times$ of rubber in place of the cord $d$ I secure practically the same effect with the flat rubber strip without the wire coil $f$.

When applied and arranged in the manner described, the cord or the flat strip strengthens the standing-side along the line of weakness or least resistance to the stretching and bending strains, contributing an elastic quality to the same at and along the top-edge to an extent that will prevent the edge from cracking for some considerable time when in use in the machine; and in the event of the material cracking the fabric covered strip will check any cracks that may start at the edge of the standing side and prevent them from penetrating below the line of the inserted strip, whether the covered cord $d$ or the flat strip $d^\times$ be used. The serviceability of the standing edge of the belt will thus be seen to be limited only by the durability of the inserted strip, and although that part is formed of rubber, the same as the standing side in which it is embedded, the woven covering isolates the elastic strip from the surrounding rubber in which it is embedded, to such an extent that it retains its own characteristic elasticity instead of becoming a part of the mass of surrounding rubber after the vulcanizing operation. In this respect my invention will be seen to differ from other means of strengthening the standing side of a rubber-belt by inserting a cord or strip of non-elastic material as has heretofore been done or proposed to be done to strengthen the standing strip along the top-edge.

What I claim as my invention is:

1. In an endless belt having standing sides, the combination with the standing-side of a means to strengthen the same comprising a strip of rubber embedded in the material along the top-edge and a covering of woven fabric separating the said strip from the surrounding material of the standing side.

2. In an endless belt having standing sides, the combination with the standing side of an elastic strip embedded in the material along the top-edge thereof, a covering of woven-fabric separating the said strip of the standing-side and a wire coil surrounding the woven covering.

3. An endless belt having standing sides of elastic material, and a strengthening strip in the material of the standing-side along the edge thereof comprising a strip of elastic material embedded in the material of the standing side, and a covering of fabric surrounding the said strip and separating it from the surrounding material.

4. An endless belt having standing sides formed of rubber, in combination with a strip embedded in the material of each standing side near its top edge and having characteristic qualities of elasticity different from that of the material of the standing sides, and a covering for separating each strip from the material of the standing sides.

GEORGE GATES.

Witnesses:
E. E. OSBORN,
F. G. OSBORN.